United States Patent
Suzuki

(10) Patent No.: US 8,919,466 B2
(45) Date of Patent: Dec. 30, 2014

(54) ELECTRIC COMPONENT ARRANGEMENT STRUCTURE OF VEHICLE

(71) Applicant: Mazda Motor Corporation, Hiroshima (JP)

(72) Inventor: Seigo Suzuki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 73 days.

(21) Appl. No.: 13/659,634

(22) Filed: Oct. 24, 2012

(65) Prior Publication Data

US 2013/0126252 A1 May 23, 2013

(30) Foreign Application Priority Data

Nov. 21, 2011 (JP) ................. 2011-254272

(51) Int. Cl.
 *B60K 5/00* (2006.01)
 *B60K 1/00* (2006.01)
 *B62D 21/15* (2006.01)
 *B60K 1/04* (2006.01)
(52) U.S. Cl.
 CPC ............... *B60K 1/00* (2013.01); *B62D 21/152* (2013.01); *B60K 1/04* (2013.01); *B60K 2001/0411* (2013.01)
 USPC ..................................................... 180/65.21
(58) Field of Classification Search
 CPC .... B60K 1/04; B60K 2001/0411; B60K 1/00; B62D 21/152
 USPC .................... 180/53.1, 65.21, 65.22
 See application file for complete search history.

(56) References Cited

U.S. PATENT DOCUMENTS

| | | | | |
|---|---|---|---|---|
| 6,119,799 A * | 9/2000 | Morisawa et al. | ......... | 180/65.25 |
| 7,977,917 B2 * | 7/2011 | Asada | ............ | 320/134 |
| 8,294,419 B2 * | 10/2012 | Sasaki | ............ | 320/108 |
| 8,517,127 B2 * | 8/2013 | Kanno | .......... | 180/65.1 |
| 8,596,391 B2 * | 12/2013 | Kshatriya | ............ | 180/65.22 |
| 2007/0219670 A1 * | 9/2007 | Tanaka et al. | ................ | 700/295 |
| 2008/0197810 A1 * | 8/2008 | Ishikawa et al. | .............. | 320/135 |
| 2009/0322123 A1 * | 12/2009 | Tanaka et al. | ............ | 296/203.02 |
| 2010/0038156 A1 * | 2/2010 | Fujitake et al. | ............ | 180/65.22 |
| 2010/0102628 A1 * | 4/2010 | Soma et al. | .................. | 307/10.1 |
| 2012/0303189 A1 * | 11/2012 | Namuduri et al. | ............. | 701/22 |
| 2013/0119706 A1 * | 5/2013 | Katayama et al. | ....... | 296/187.09 |

FOREIGN PATENT DOCUMENTS

| | | |
|---|---|---|
| JP | 2006-089040 A | 4/2006 |
| JP | 2006-281806 A | 10/2006 |

\* cited by examiner

*Primary Examiner* — J. Allen Shriver, III
*Assistant Examiner* — Brian Cassidy
(74) *Attorney, Agent, or Firm* — Studebaker & Brackett PC

(57) ABSTRACT

A generator is provided at a front portion of an engine provided between a pair of front side frames at an offset position on one side, in a vehicle width direction, of a vehicle, and an electricity-storage device, a convertor, and a battery are provided on the other side, in the vehicle width side, of the vehicle. Accordingly, the electricity-storage device, the convertor, and the battery can be restrained from receiving any improper heat influence from the engine, and the length of harnesses coupling the generator, the electricity-storage device, the convertor, and the battery can be shortened as much as possible.

15 Claims, 10 Drawing Sheets

ELECTRIC COMPONENT ARRANGEMENT STRUCTURE OF VEHICLE

BACKGROUND OF THE INVENTION

The present invention relates to an electric component arrangement structure of a vehicle which comprises an electricity-storage device to store the electricity and others.

Conventionally, it is well known that a vehicle, such as an automotive vehicle, is equipped with an electricity-storage device to store the electricity, such as a rechargeable battery (for example, a nickel metal hydride rechargeable battery, a nickel-cadmium rechargeable battery, a lithium-ion rechargeable battery, or a lead-acid battery). It is also known that a capacitor is used, in place of the rechargeable battery, as the electricity-storage device (see Japanese Patent Laid-Open Publication No. 2006-89040, for example).

While the above-described electricity-storage device is usually provided in an engine room formed at a front portion of the vehicle as disclosed in Japanese Patent Laid-Open Publication No. 2006-281806, for example, that is provided below a floor of a vehicle compartment in some cases as disclosed in the above-described first patent document.

Herein, when the electricity generated by a generator (alternator) which is driven by the engine is stored at the electricity-storage device, charging the electricity with a high voltage may be efficient. In this case, a converter to convert the electricity, such as a DC/DC convertor, may be necessary for supplying the electricity stored at the electricity-storage device to the battery, such as the lead-acid battery, or an electric load.

The electricity-storage device, the convertor or the battery are usually weak in heat, and the electricity-storage device which is comprised of the capacitor, in particular, generates heat during its use. Accordingly, in a case in which these electric components are installed to the vehicle, it may be necessary to configure such that these components do not receive any improper heat influence from the engine as much as possible. Further, it may be preferable that the length of harnesses which couple the generator, the electricity-storage device, the convertor and the battery be shortened to reduce a supply loss of the electricity via the harnesses.

SUMMARY OF THE INVENTION

The present invention has been devised in view of the above-described matters, and an object of the present invention is to provide an electric component arrangement structure of a vehicle which can restrain the electricity-storage device, the convertor, and the battery from receiving any improper heat influence from the engine and also shorten the length of the harnesses coupling the generator, the electricity-storage device, the convertor, and the battery as shorter as possible.

According to the present invention, there is provided an electric component arrangement structure of a vehicle, comprising a right-and-left pair of front side frames extending in a vehicle longitudinal direction, an engine provided between the pair of front side frames at an offset position on one side, in a vehicle width direction, of the vehicle, a generator driven by the engine to generate electricity, an electricity-storage device to store the electricity generated by the generator, a convertor to convert the electricity from the electricity-storage device, a battery, to which the electricity converted by the convertor is supplied, and harnesses coupling the generator, the electricity-storage device, the convertor and the battery, wherein the generator is provided at a front portion of the engine, and the electricity-storage device, the convertor, and the battery are provided on the other side, in the vehicle width side, of the vehicle.

According to the present invention, since the electricity-storage device, the convertor, and the battery are provided on the other side, in the vehicle width side, of the vehicle which is opposite to the one side where the engine is provided, even if such electric components are provided in the engine room (between the pair of front side frames), they can be restrained from receiving any heat influence from the engine. Further, the harnesses coupling the electricity-storage device, the convertor and the battery can be properly arranged in a space positioned on the other side, in the vehicle width direction, of the vehicle. Herein, while the generator provided at the engine is usually provided on the one side, in the vehicle width direction, of the vehicle, a space exists between the engine and a shroud which supports a radiator over an entire width of the vehicle. Accordingly, it becomes possible, by providing the generator at the front portion of the vehicle, to arrange the harness coupling the generator and the electricity-storage device substantially straightly in the above-described space from the one side to the other side in the vehicle width direction. Thus, the length of the harnesses coupling the generator, the electricity-storage device, the convertor, and the battery can be shortened as shorter as possible.

According to an embodiment of the present invention, the electricity-storage device is provided on an outside, in the vehicle width direction, of one of the front side frames which is positioned on the other side, in the vehicle width side, of the vehicle. Thereby, the electricity-storage device can be further restrained from receiving any improper heat influence from the engine, and the electricity-storage device can be also cooled by the vehicle traveling air.

According to another embodiment of the present invention, the electricity-storage device is provided in front of one of front wheels which is positioned on the other side, in the vehicle width side, of the vehicle, the convertor is provided in back of the above-described one of the front wheels which is positioned on the other side, in the vehicle width side, of the vehicle, and a harness coupling the electricity-storage device and the convertor is arranged along a wheel arch which is formed above the above-described one of the front wheels which is positioned on the other side, in the vehicle width side, of the vehicle. Thereby, the generator and the electricity-storage device can be located substantially at the same position in the vehicle longitudinal direction, so that the harness coupling the generator and the electricity-storage device can be arranged to extend in the vehicle width direction from the generator toward the electricity-storage device, without bending greatly in the vehicle longitudinal direction. Consequently, the length of the harness coupling the generator and the electricity-storage device can be shortened as shorter as possible. Further, since the harness coupling the electricity-storage device and the convertor is arranged along the wheel arch, the length of the harness coupling the electricity-storage device and the convertor can be shortened as shorter as possible without any interference of the harness with the front wheel. Moreover, since the electricity-storage device is provided in front of the front wheel, the electricity-storage device can be surely cooled by the vehicle traveling air.

Herein, the convertor may be provided between one of front seats which is positioned on the other side, in the vehicle width side, of the vehicle and a floor panel.

According to another embodiment of the present invention, crash cans are provided at respective front ends of the pair of front side frames, and the electricity-storage device is provided in back of one of the crash cans which is positioned on the other side, in the vehicle width side, of the vehicle. Thereby, even if the electricity-storage device is provided at the front portion of the vehicle (particularly, in front of the front wheel), a situation in which the impact-absorption function of the crash cans in a vehicle head-on collision is hurt by the electricity-storage device can be properly avoided, and also any breakage of the electricity-storage device can be prevented.

According to another embodiment of the present invention, the electric component arrangement structure further comprises a suspension cross member supporting both front wheels at both end portions thereof, wherein the suspension cross member includes a forward extension portion which extends forward below and substantially along one of the front side frames which is positioned on the other side, in the vehicle width direction, of the vehicle, and the electricity-storage device is located at the same position as a portion of the forward extension portion in the vehicle longitudinal direction, a lower end of which is located above a level of a lower end of the forward extension portion. Thereby, any interference of the electricity-storage device with a road surface can be restrained, so that the electricity-storage device can be protected properly.

According to another embodiment of the present invention, the engine is provided laterally with an output shaft extending in the vehicle width direction, an air-intake duct is provided at a front portion of the engine, and the generator is provided beside the air-intake duct at the front portion of the engine. Thereby, the generator may not receive any influence of the exhaust heat, and the generator provided at the engine may not receive any improper heat influence from the engine. Further, it becomes possible that the vehicle traveling air hits against the generator.

According to another embodiment of the present invention, a transmission is provided on the other side, in the vehicle width direction, of the vehicle relative to the engine, and the battery is provided above the transmission. Herein, the height of the transmission is generally smaller than that of the engine. Accordingly, by providing the battery above the transmission, the battery can be provided efficiently in a space in the engine room, restraining the improper heat influence from the engine.

Other features, aspects, and advantages of the present invention will become apparent from the following description which refers to the accompanying drawings.

DETAILED DESCRIPTION OF THE INVENTION

Hereafter, a preferred embodiment of the present invention will be described referring to the accompanying drawings.

Figure 1:
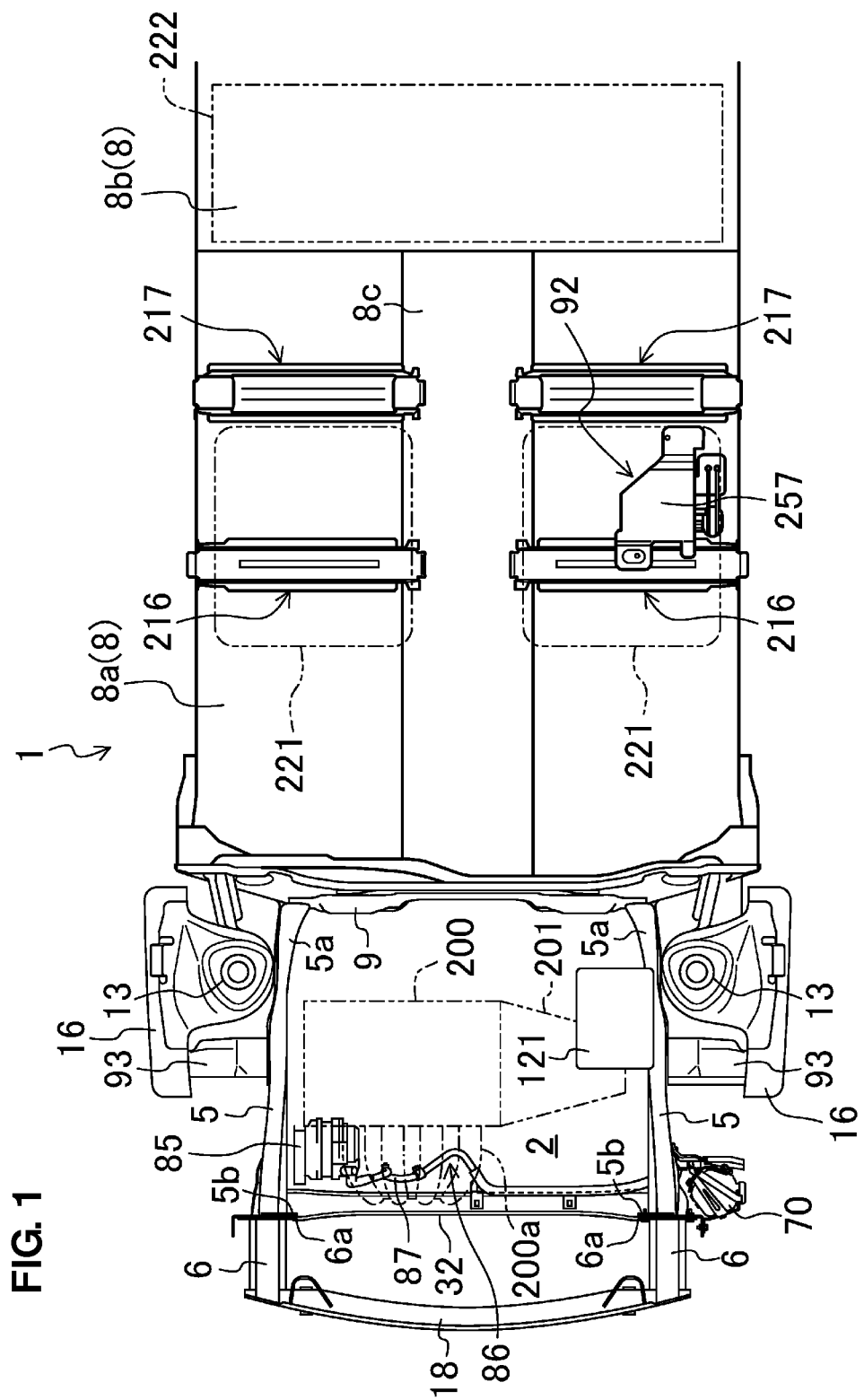
FIG. 1 is a plan view showing a structure of a vehicle to which an electric component arrangement structure according to an embodiment of the present invention is applied.

FIG. 1 shows a structure of a vehicle to which an electric component arrangement structure according to an embodiment of the present invention is applied. An engine 200 and a transmission 201 are arranged side by side in a vehicle width direction in an engine room 2 formed at a front portion of the vehicle 1. Right and left front wheels 3 (see FIG. 5) of the wheel 1 are driven by the engine 200 and the transmission 201. Hereinafter, front, rear, left, right, upper and lower sides of the vehicle 1 will be referred to as front, rear, left, right, upper and lower sides simply.

A pair of right-and-left front side frames 5 which extends longitudinally is arranged at both end portions, in a vehicle width direction (a lateral direction), of the engine room 2. The engine 200 is laterally provided between the front side frames 5 (i.e., in the engine room 2) at an offset position on one side (on the right side in the present embodiment), in the vehicle width direction, of the vehicle 1 such that its output shaft (crankshaft) extends in the vehicle width direction. A front side of the engine 200 is an intake side, and a rear side of that is an exhaust side. An intake manifold 200a (intake duct) is provided at a front portion of the engine 200, and an exhaust manifold, not illustrated, is provided at a rear portion of that. Further, the transmission 201 is provided on the other side (on the left side in the present embodiment), in the vehicle width direction, of the engine 200. The height of the transmission 201 is smaller than that of the engine 200, and an upper end of the transmission is located below the level of an upper end of the engine 200.

Figure 3:
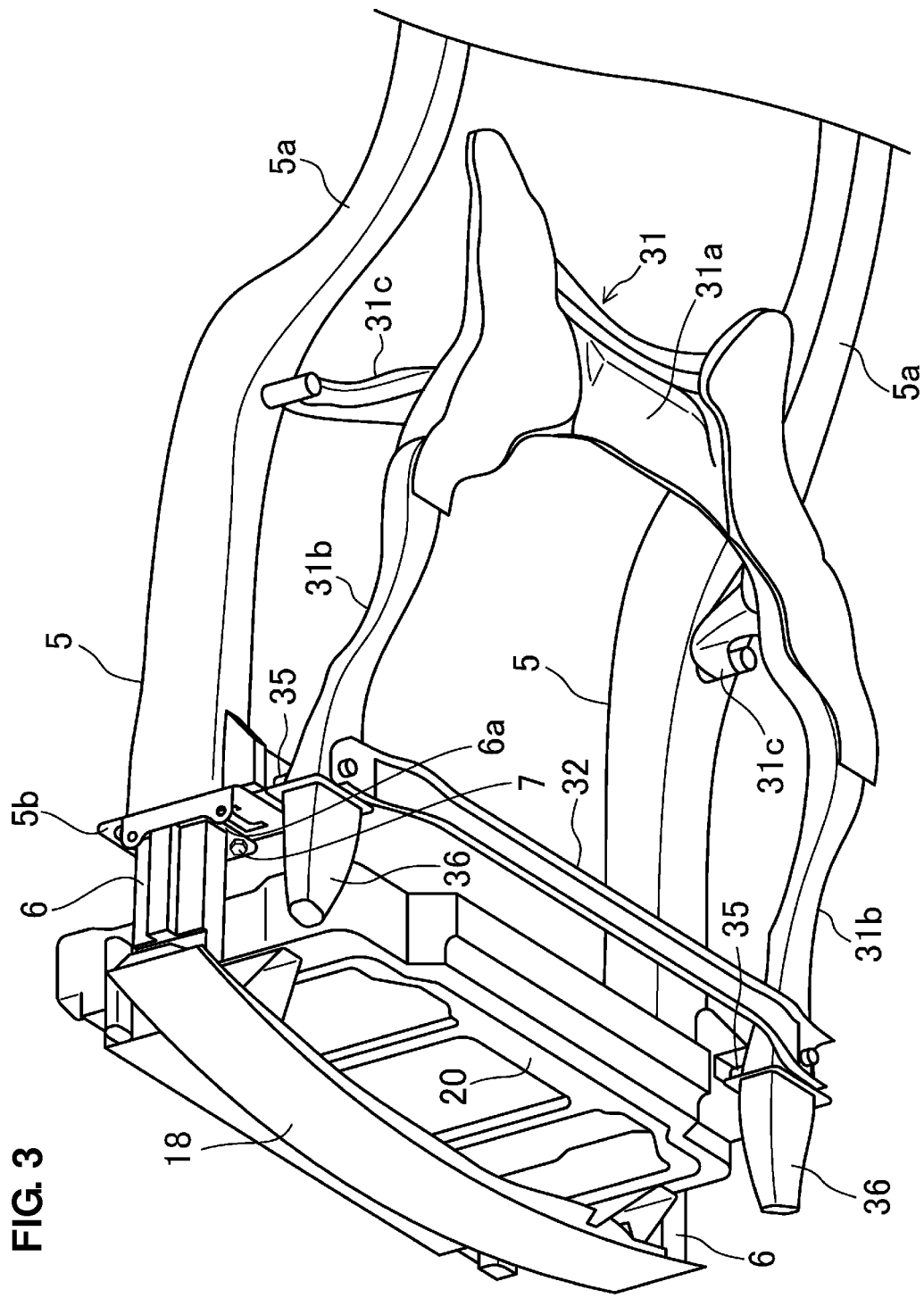
FIG. 3 is a perspective view showing front side frames and a suspension cross member of the vehicle, when viewed obliquely from a vehicle left side, a vehicle front side, and a vehicle lower side.

A rear portion of each of the front side frames 5 is a kick portion 5a which slants obliquity downward and rearward (see FIG. 3, in particular). A dash panel 9 which partitions a vehicle compartment from the engine room 2 is provided substantially at the same longitudinal position as the kick portion 5a (illustration of the dash panel 9 is omitted in FIG. 3).

Arc-shaped mudguards 93 which cover over the front wheels 3 are respectively provided on the outside, in the vehicle width direction, of the right-and-left front side frames 5. A suspension tower 13 is provided above each of the right and left mudguards 93. Respective upper end portions of the right-and-left suspension towers 13 are respectively fixed to a pair of right-and-left apron reinforcement members 16 which extends longitudinally, and respective lower end portions of the suspension towers 13 are respectively fixed to the front side frames 5.

A front bumper, not illustrated, is provided at a front end portion of the vehicle 1, and a bumper beam 18 extending in the vehicle width direction is arranged inside the front bumper. This bumper beam 18 receives a collision load in a head-on collision of the vehicle 1.

Crash cans 6 are provided at respective front ends of the right-and-left front side frames 5. Specifically, a flange portion 5b is formed at the front end of each of the front side frames 5, and a flange portion 6a is formed at a rear end of each of the crash cans 6. These flange portions 5b, 6a are contacted and fixed to each other by a fastening member 7 (see FIG. 3) which is comprised of bolts and nuts. Herein, the right-and-left crash cans 6 are located at the same longitudinal position. Further, the above-described portions/members provided at the right and left sides are fundamentally symmetrical about a vertical face which passes the center, in the vehicle width direction, of the vehicle 1 and extends longitudinally.

Right-and-left both end portion of the bumper beam 18 are fixed to respective front ends of the right-and-left crash cans 6. The crash cans 6 come to crush longitudinally when the bumper beam 18 receives the collision load from the front in the head-on collision of the vehicle 1, so as to perform impact absorption. Herein, the impact absorption can be properly performed only by the crash cans 6 crushing in a light collision. In a heavy collision, however, the impact absorption can be properly performed by both the crash cans 6 crushing and the front side frames 5 longitudinally crushing.

Figure 2:
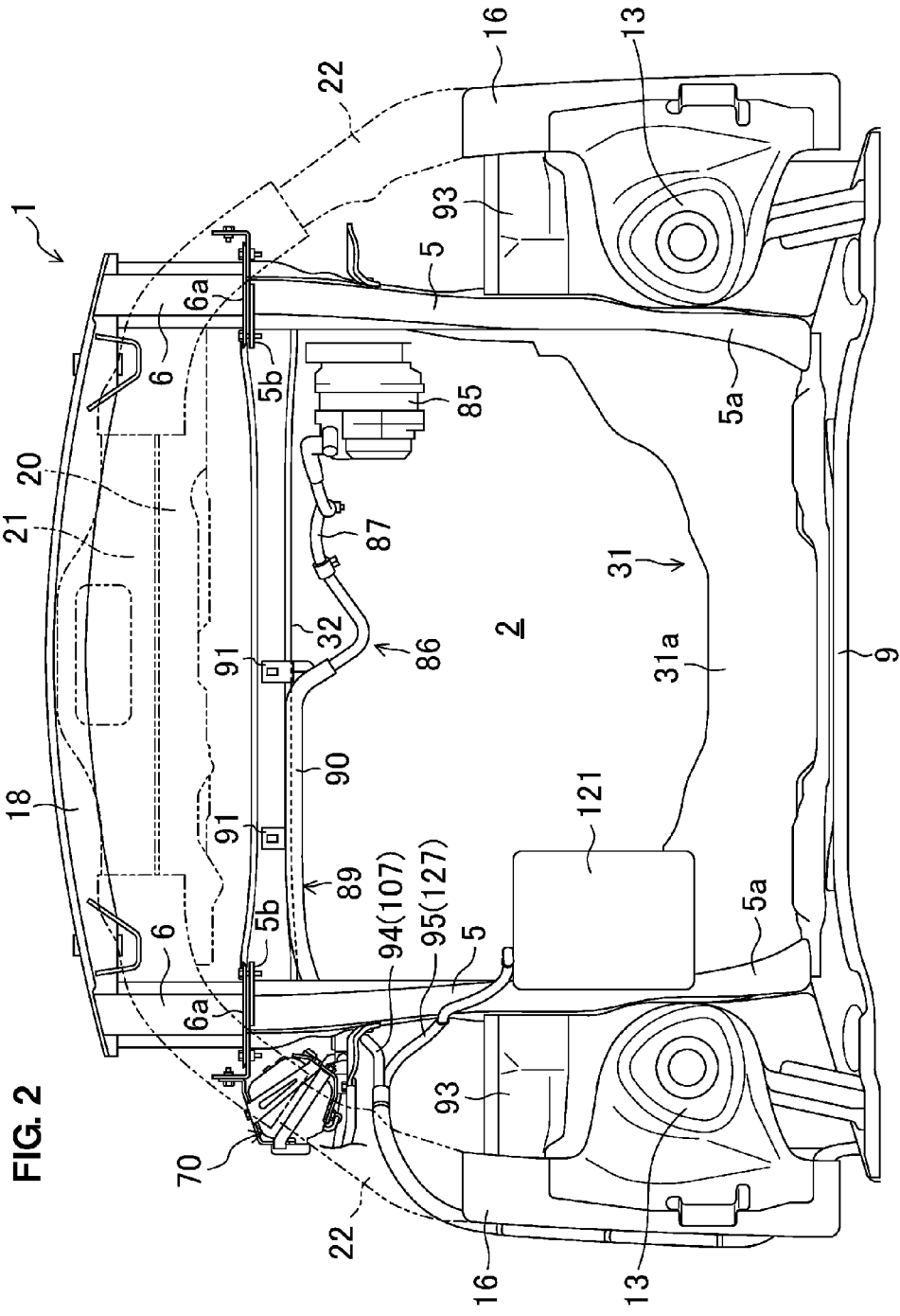
FIG. 2 is a plan view showing a major part of a front portion of the vehicle.

Between the right-and-left crash cans 6 behind the bumper beam 18 is provided a frame-shaped shroud 20 (see FIGS. 2-6) which supports a radiator, not illustrated. As shown in FIG. 2, an upper member 21 which constitutes an upper portion of the shroud 20 extends outward and rearward, and both end portions of the upper member 21 are connected to respective front ends of the right-and-left apron reinforcement members 16 via connecting members 22, respectively. Thereby, the shroud 20 is supported at the right-and-left apron reinforcement members 16.

A stiffener for pedestrian protection (not illustrated) is fixed to a lower side portion of the shroud 20 such that it projects forward over the left side to the right side. This stiffener operates to sweep away a leg portion of a pedestrian who collides against a front face of the vehicle 1 so as to make the pedestrian fall down toward the vehicle 1, thereby preventing any injury of the pedestrian, such as a fracture of the leg portion properly. A front side of the stiffener is covered with the front bumper.

Figure 4:
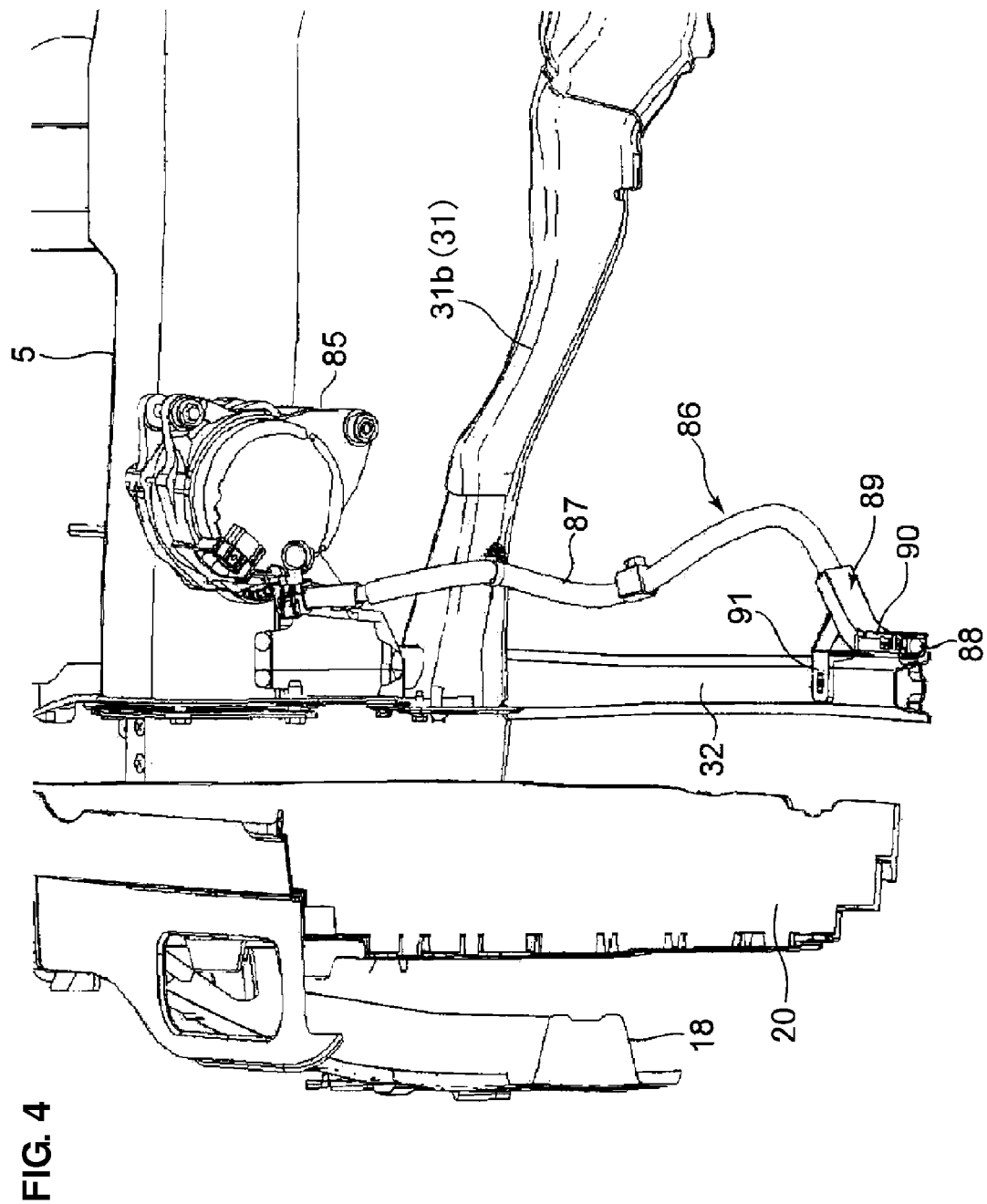
FIG. 4 is a perspective view showing the vicinity of a generator, when viewed obliquely from the vehicle left side and a vehicle upper side.

A suspension cross member 31, which extends in the vehicle width direction and supports right-and-left front wheels 3 at its both end portions, is provided substantially at the same longitudinal position, in the vehicle longitudinal direction, as the suspension tower 13 (see FIGS. 2, 4 and others). The suspension cross member 31 comprises a body portion 31a which extends in the vehicle width direction and right-and-left forward-extension portions 31b which extends forward from both-side end portions of the body portion 31a. Right-and-left front-wheel suspension arms (lower arms) are supported at right-and-left both end portions of the body portion 31a, and the front wheels 3 are supported at the suspension cross member 31 via the front-wheel suspension arms. Upward extension portions 31c which extend upward are provided at both-side end portions on an upper face of the body portion 31a, and upper end portions of the upward extension portions 31c are respectively fixed to respective lower faces of the right-and-left front side frames 5.

The left forward-extension portions 31b extends forward below and substantially along the left front side frame 5. The right forward-extension portions 31b extends forward below and substantially along the right front side frame 5. The right-and-left forward-extension portions 31b are symmetrical about the vertical face which passes the center, in the vehicle width direction, of the vehicle 1 and extends longitudinally.

Front end portions of lower faces of the right-and-left forward-extension portions 31b are connected by a connection cross member 32. Thus, the body portion 31a and the forward extension portions 31b of the suspension cross member 31 and the connection cross member 32 constitute a perimeter frame (a vehicle-body member) which is of a substantially-rectangular frame shape in a plan view.

A front side portion of each of the forward extension portion 31b is located above the level of a rear side portion of that. Further, a cylindrical member 35 which extends upward is fixed to a front end portion of an upper face of each of the forward extension portions 31b. An upper end of the cylindrical member 35 is fixed to a horizontally-bending portion of the flange portion 5b of the front side frame 5. Further, a connecting member 36 which is connected to right-and-left both end portions of the above-described stiffener is fixed to a front end of each of the forward extension portions 31b.

A lower end portion of the dash panel 9 is connected to a front end portion of the floor panel 8 which forms a bottom face of the vehicle compartment. The floor panel 8 comprises a front floor portion 8a and a rear floor portion 8b which is positioned in back of the front floor panel 8a and rises from a rear end of the front floor portion 8a to a higher position.

Two right-and-left front seats 221 (one is a driver's seat and the other is a passenger's seat (assistant seat)) are arranged side by side in the vehicle width direction on the front floor portion 8a of the floor panel 8. A rear seat 222 is arranged in back of the front seats 21 on the floor panel 15 (i.e., on the rear floor portion 8b). A rear-side portion of the front floor portion 8a located in back of the front seats 221 (i.e., a portion between the front seats 221 and the rear seat 222) is a foot-placing space for a passenger seated in the rear seat 222.

At a central portion, in the vehicle width direction, of the front floor portion 8a of the floor panel 8 (between the right and left front seats 221) is formed a tunnel portion 8c. Further, a pair of front cross members 216 and a pair of rear cross members 217 are arranged on an upper face of the front floor portion 8a on both sides of the tunnel portion 8c. These cross members 216, 217 extend in the vehicle width direction, respectively, and are located away from each other in the vehicle longitudinal direction.

The electricity-storage device 70 to store the electricity is provided on the outside (left side), in the vehicle width direction, of the left front side frame 5, that is—at a position near a left-outside portion of the engine room and between the front wheel 3 and the crash can 6 in the longitudinal direction. This electricity-storage device 70 is supported at the flange portion 5b of the left front side frame 5. Thus, the electricity-storage device 70 is arranged at a left-side portion of the vehicle 1, i.e., on the opposite side to the above-described one side (right side), in the vehicle width direction, of the vehicle where the engine 200 is provided. Further, the electricity-storage device 70 is provided at an offset position located on the inside, in the vehicle width direction, relative to the left-side front wheel 3 (in a forward moving state of the vehicle) in an elevational view of the vehicle, and substantially at the same longitudinal position as a generator 85, which will be described later. Herein, the electricity-storage device 70 may be supported at the flange portion 6a of the left crash can 6.

Figure 5:
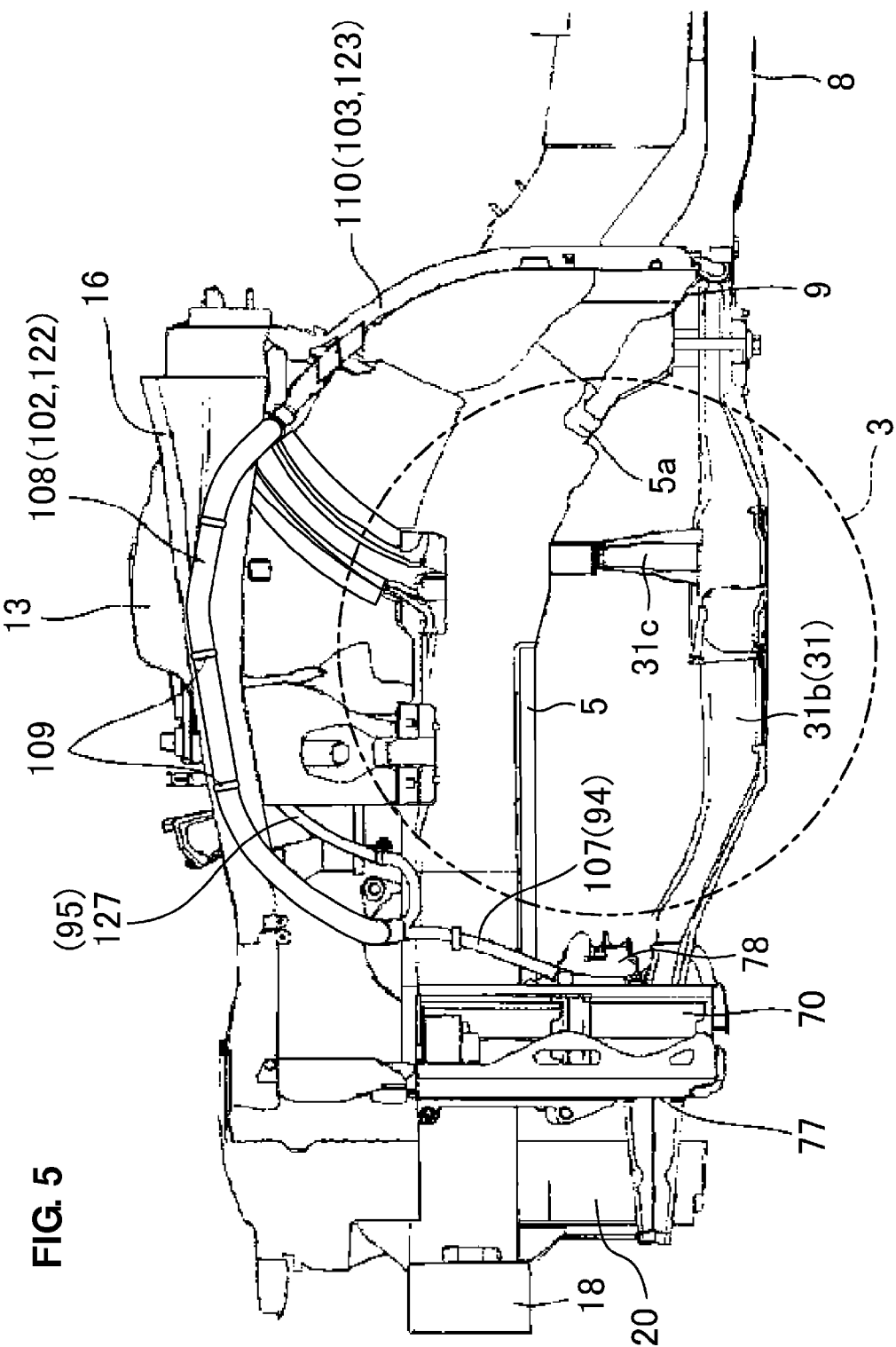
FIG. 5 is a side view showing the major part of the front portion of the vehicle, when viewed from the vehicle left side.

The electricity-storage device 70 of the present embodiment includes plural electricity-storage elements which are comprised of a capacitor, and fixed to the flange portion 5b of the left front side frame 5 via a holding member 77 (see FIG. 5).

Herein, when the head-on collision of the vehicle 1 occurs and the collision is a light collision, the right-and-left crash cans 6 receive the collision load from the bumper beam 18 and crush longitudinally. Thereby, the impact absorption is properly performed. In this case, since the electricity-storage device 70 is positioned in back of the crash can 6, the impact-absorption function of the crash cans 6 may not be hurt by the electricity-storage device 70. Further, the electricity-storage device 70 may not be damaged, either.

In a heavy collision in which both the crash cans 6 and the front side frames 5 crush, the right-and-left front side frames 5 crush longitudinally, thereby performing the impact absorption function. In this case, the electricity-storage device 70 retreats according to the crushing of the left front side frames 5. If the electricity-storage device 70 interferes with the left-side front wheel 3 during this retreat of the electricity-storage device 70, the impact absorption function of the front side frames 5 may be influenced improperly by this interference. According to the present embodiment, however, since the electricity-storage device 70 is provided at the offset position located on the inside, in the vehicle width direction, relative to the left-side front wheel 3 (at the position between the left-side front wheel 3 and the left front side frame 5 in the vehicle width direction) in the elevational view of the vehicle, any interference of the electricity-storage device 70 with the left-side front wheel 3 is basically avoided, so that the proper impact absorption function of the front side frames 5 can be ensured. Herein, since it is not be necessarily required that the electricity-storage device 70 is provided at the above-described offset position, the electricity-storage device 70 may be positioned substantially at the same position as the left-side front wheel 3 in the vehicle width direction.

The electricity-storage device 70 is of a vertically extending shape and located at the same position as a front side portion of the forward extension portion 31*b* in the longitudinal direction. An upper end of the electricity-storage device 70 is located substantially at the same level as an upper end face of the front side frame 5. A lower end of the electricity-storage device 70 is located below the level of a lower end of the front side portion of the forward extension portion 31*b*, but above the level of a lower end of a rear side portion of the forward extension portion 31*b*. That is, the electricity-storage device 70 is located at the same position as a portion of the left-side forward extension portion 31*b* in the vehicle longitudinal direction, and the lower end of the electricity-storage device 70 is located above the level of the lower end of the left-side forward extension portion 31*b*. Thereby, any interference of the electricity-storage device 70 with a road surface can be prevented, so that the electricity-storage device 70 can be restrained from being damaged by such interference.

The generator 85 (alternator) which is driven by the engine and generates the electricity is provided at a right-side portion of a front portion of the engine 200 (on the right side of the intake manifold 200*a*) as shown in FIGS. 1, 2 and 4. That is, the generator 85 is rotated by a crankshaft of the engine 200 via a belt arranged at right-side end face of the engine 200 and generates the electricity. The electricity generated by the generator 85 is supplied to and stored at the electricity-storage device 70. The generator 85 converts the kinetic energy of the vehicle 1 during a vehicle deceleration to the electricity (energy recovery), and this electricity is stored at the electricity-storage device 70. The generator 85 and the electricity-storage device 70 are coupled by a first harness 86 as shown in FIGS. 2 and 4, and the electricity from the generator 85 is supplied to the electricity-storage device 70 via the first harness 86.

The generator 85 is located at a right side portion of the engine room 2 substantially at the same position as the front side frame 5 and in back of the connection cross member 32. The first harness 86 comprises a downward extension portion 87 which extends obliquely downward from the generator 85 toward the center, in the vehicle width direction, of the connection cross member 32 and a horizontal portion 88 which extends in the vehicle width direction along the connection cross member 32 (see FIG. 4). A left-side end portion of the horizontal portion 88 bends upward and is connected to a connection portion 78 (see FIG. 5) which is provided at the above-described holding member 77. The downward extension portion 87 passes below the intake manifold 200*a*.

A first protector member 89 to protect the horizontal portion 88 of the first harness 86 is provided at a back face of the connection cross member 32. The first protector member 89 comprises a square-pipe-shaped protector body portion 90, into which the horizontal portion 88 of the first harness 86 is inserted, and an attaching bracket 91 which is provided at the protector body portion 90. The attaching bracket 91 is fixed to an upper face of the connection cross member 32 via fastening members, such as bolts and engaging members. Thereby, the horizontal portion 88 of the first harness 86 is fixed to the back face of the connection cross member 32 in a state in which it is held by the first protector member 89. By fixing the horizontal portion 88 to the connection cross member 32 described above, the first harness 86 can be supported stably. Further, by fixing the first harness 86 (the horizontal portion 88) to the back face of the connection cross member 32, the first harness 86 can be effectively protected from the collision load in the head-on collision of the vehicle 1, and a situation in which the retreat of the shroud 20 or the radiator supported at the shroud 20 is blocked by the first harness 86 can be properly avoided.

Figure 9:
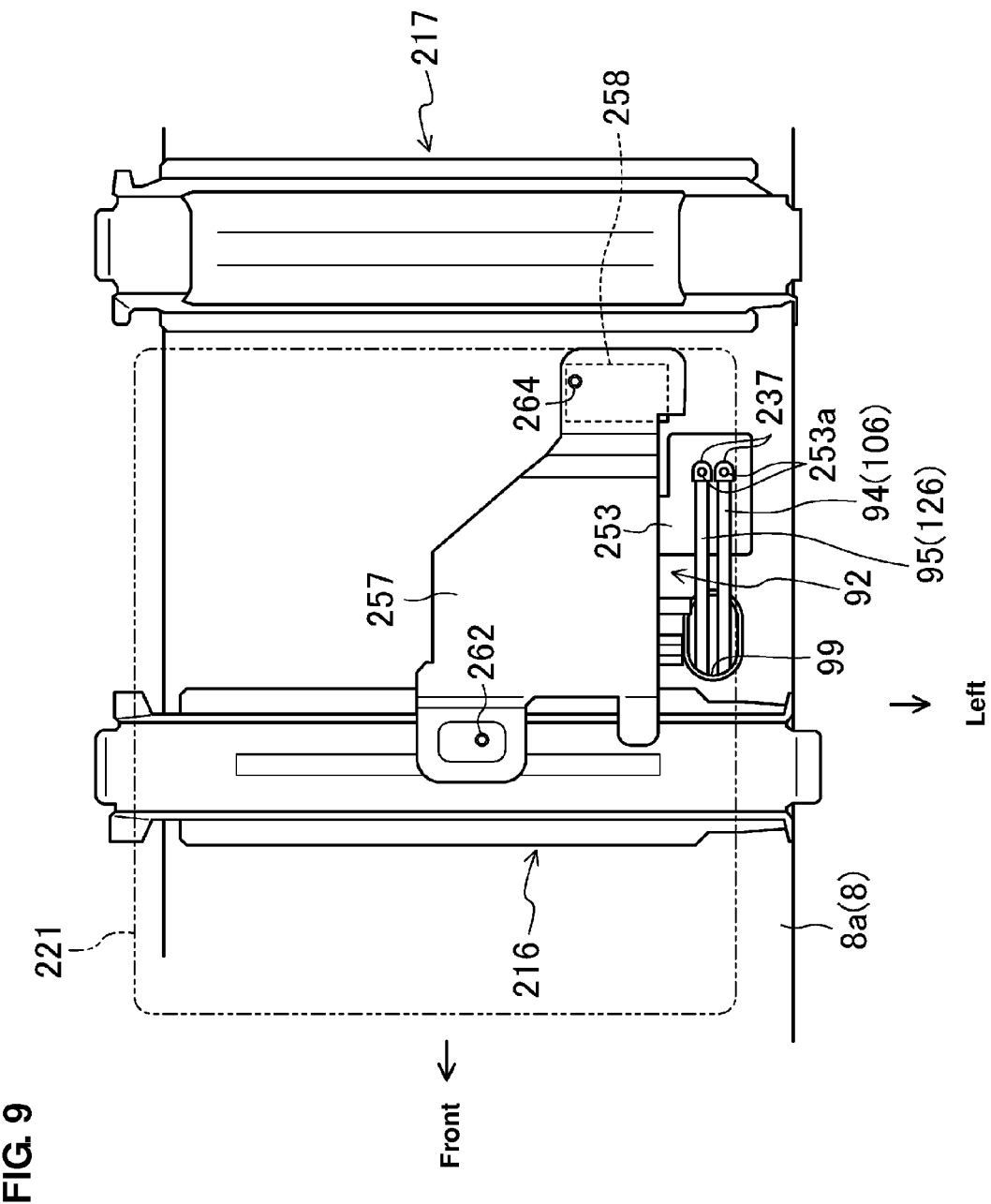
FIG. 9 is an enlarged plan view showing the vicinity of a convertor at an upper face of the floor panel.

As shown in FIGS. 1 and 9, a convertor 92 to convert the electricity supplied from the electricity-storage device 70 is provided between the left-side front seat 221 (seat cushion) and the floor panel 8 (the front floor portion 8*a*). This convertor 92 is supported at a portion of the floor panel 8 between the front cross member 216 and the rear cross member 217 via a bracket 257 which is provided above the convertor 92. A front end portion of the bracket 257 is fixed to an upper face of the front cross member 216 by a bolt 262, and a rear end portion of the bracket 257 is fixed to a support member 258 (see FIG. 9) which is provided to project at the upper face of the floor panel 8 by a bolt 264. Thus, the bracket 257 is attached onto the floor panel 8 via the support member 258. Accordingly, the convertor 92 is supported at the floor panel 8 in a state in which it is located above and away from the floor panel 8 (the front floor panel 8*a*). Thus, there occurs a gap between a heat sink, not illustrated, provided at a lower face of the convertor 92 and the floor panel 8, so that the heat generated at the convertor 92 can be properly radiated by the heat sink. Herein, the bracket 257 also functions as a protector to protect the convertor 92 from a foot of a passenger seated in the rear seat 222 which comes into a space between the front seat 221 (seat cushion) and the floor panel 8.

Figure 10:
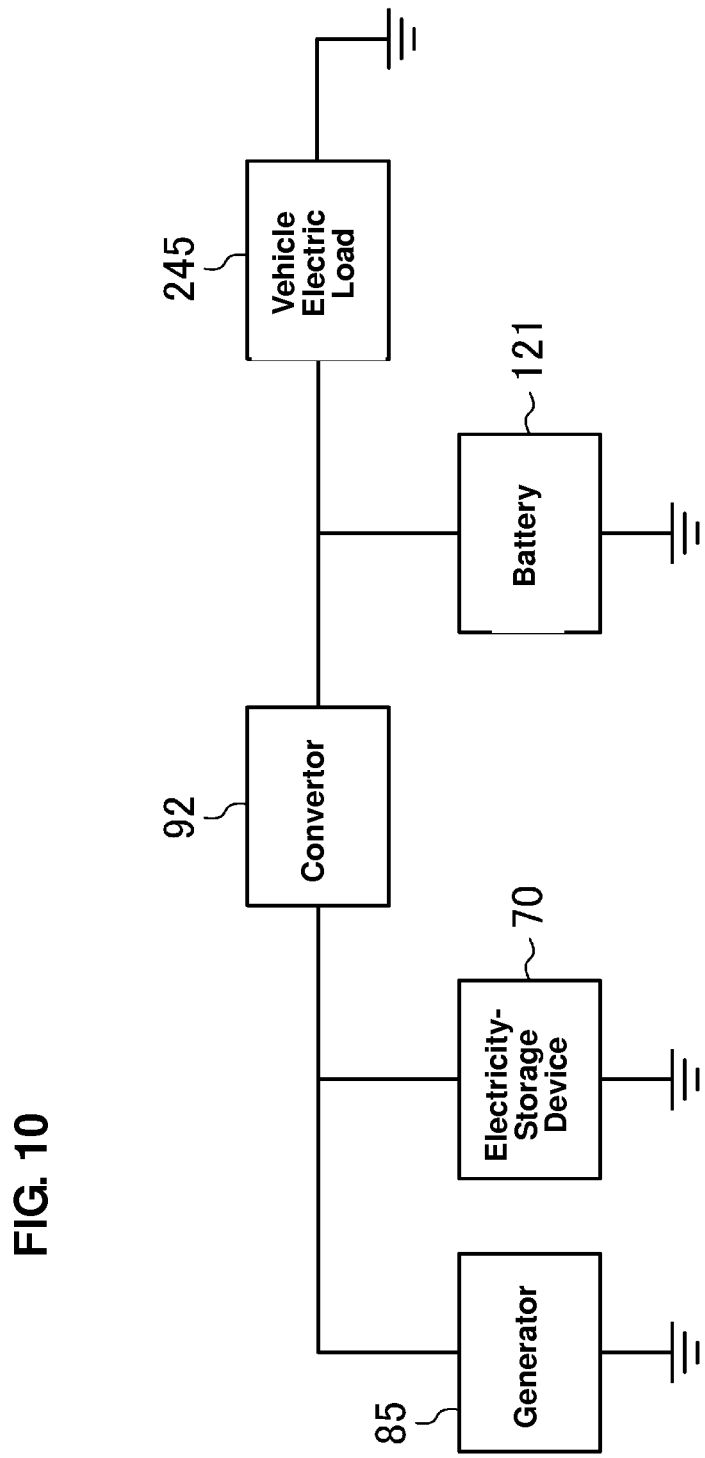
FIG. 10 is a diagram showing an electric connection relationship of the generator, an electricity-storage device, the convertor, a battery, and a vehicle electric load.

In the present embodiment, as shown in FIG. 10, the electricity (electric power) stored at the electricity-storage device 70 is supplied to a battery 121 which is comprised of a normal lead-acid battery and a vehicle electric load 245 of the vehicle 1 via the convertor 92. The vehicle electric load 245 is, for example, an audio device, a navigation device, an illumination device, or the like. Further, the extra electricity (electric power) from the electricity-storage device 70 which has not been consumed by the vehicle electric load 245 is supplied to and stored at the battery 121 to supply the electricity (electric power) to the vehicle electric load 245.

The convertor 92 includes a DC/DC convertor which properly lowers the voltage of the electricity supplied from the electricity-storage device 70 and outputs the electricity to the battery 121 and the vehicle electric load 245. That is, since the voltage (e.g., 25V) on the side of the generator 85 and the electricity-storage device 70 is higher than that (e.g., 12V) on the side of the battery 121 and the vehicle electric load 245 in the present embodiment, it may be necessary to adjust the voltage when the electricity is supplied from the electricity-storage device 70 to the battery 121 and the vehicle electric load 245. Accordingly, the convertor 92 including the DC/DC convertor is provided. The above-described adjustment of the higher voltage on the side of the generator 85 and the electricity-storage device 70 may be preferable in efficiently storing the electricity generated by the generator 85 at the electricity-storage device 70. However, the voltage on the side of the battery 121 and the vehicle electric load 245 may be higher, and in this case, the convertor 92 may be configured to increase the voltage of the electricity from the electricity-storage device 70 and outputs the electricity to the battery 121 and the vehicle electric load 245.

The convertor 92 is arranged on the left side of the vehicle 1, similarly to the electricity-storage device 70. Further, the electricity-storage device 70 is provided in front of the left-side front wheel 3, whereas the convertor 92 is provided in back of the left-side front wheel 3. The electricity-storage device 70 and the convertor 92 are coupled by a second harness 94 which passes above the left-side front wheel. The electricity is supplied from the electricity-storage device 70 to the convertor via this second harness 94. The second harness 94 is arranged along a wheel arch which is formed by the mudguard 93 provided above the left-side front wheel 3.

The convertor 92 and the battery 121 are coupled by a third harness 95, and the electricity is supplied from the convertor 92 to the battery 121 via this third harness 95.

As shown in FIG. 9, a harness connection portion 253 is provided at an outside portion, in the vehicle width direction, of the convertor 92. An upper side of the harness connection portion 253 is not covered with the bracket 257, but opens upward. Two bolts 253*a* stand at the harness connection portion 253. Meanwhile, metal fittings for connection 237 with bolt through holes formed thereat are respectively attached to rear end portions of the second and third harnesses 94, 95. By fastening nuts, not illustrated, to the bolts 253*a* in a state in which the bolts 253*a* are inserted into the bolt through holes, the second and third harnesses 94, 95 are electrically connected to the convertor 92 via the metal fittings for connection 237, the bolts 253*a*, and the nuts.

The second and third harnesses 94, 95 extend rearward, pass through a through hole 99 which is formed at a portion of the floor panel 8 (the front floor portion 8*a*) in front of the harness connection portion 253, and come out upward from below the floor panel 8 and lead to the harness connection portion 253.

Figure 6:
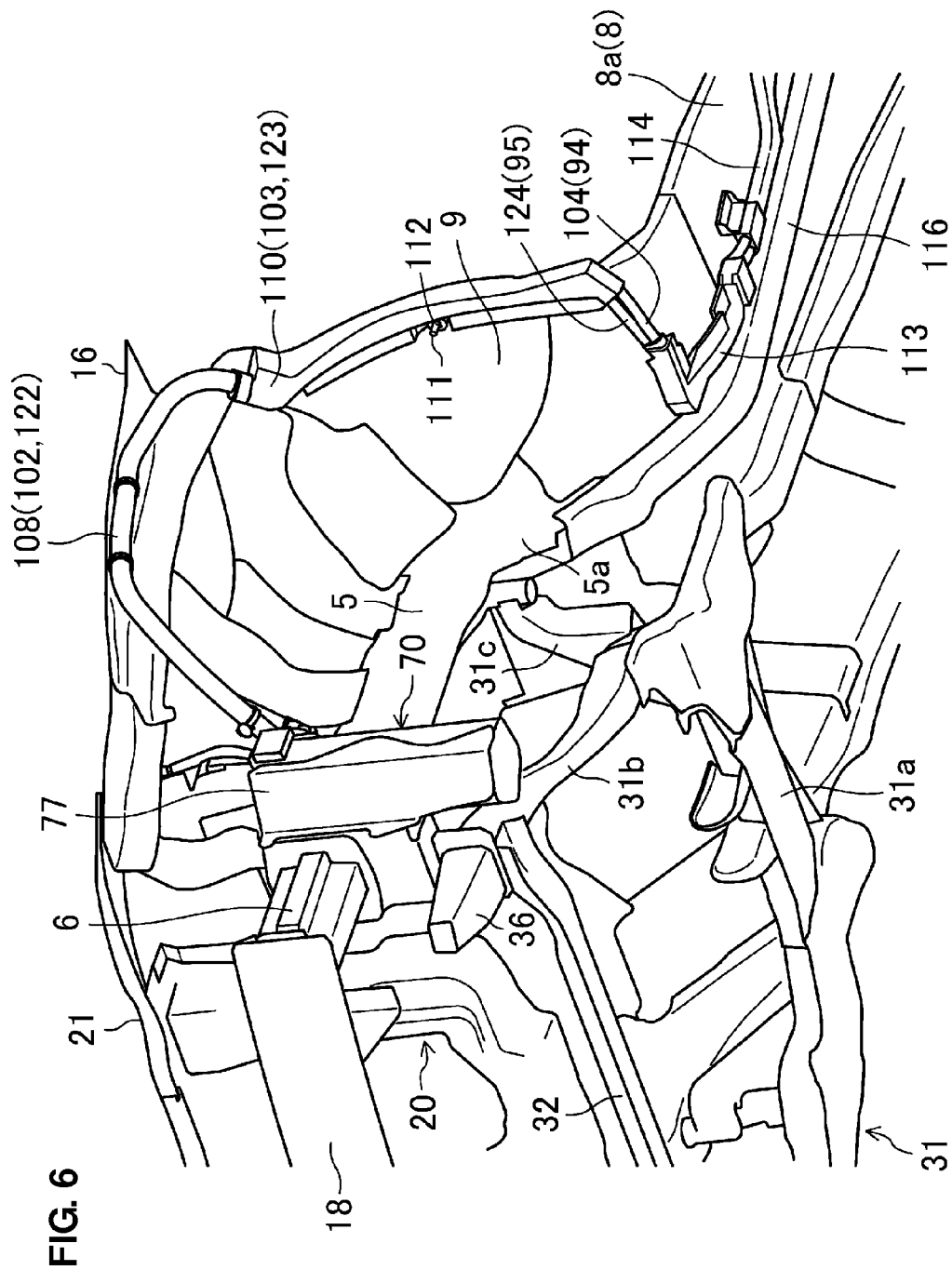
FIG. 6 is a perspective view showing second and third harnesses, when viewed obliquely from the vehicle left side, the vehicle front side, and the vehicle lower side.
Figure 7:
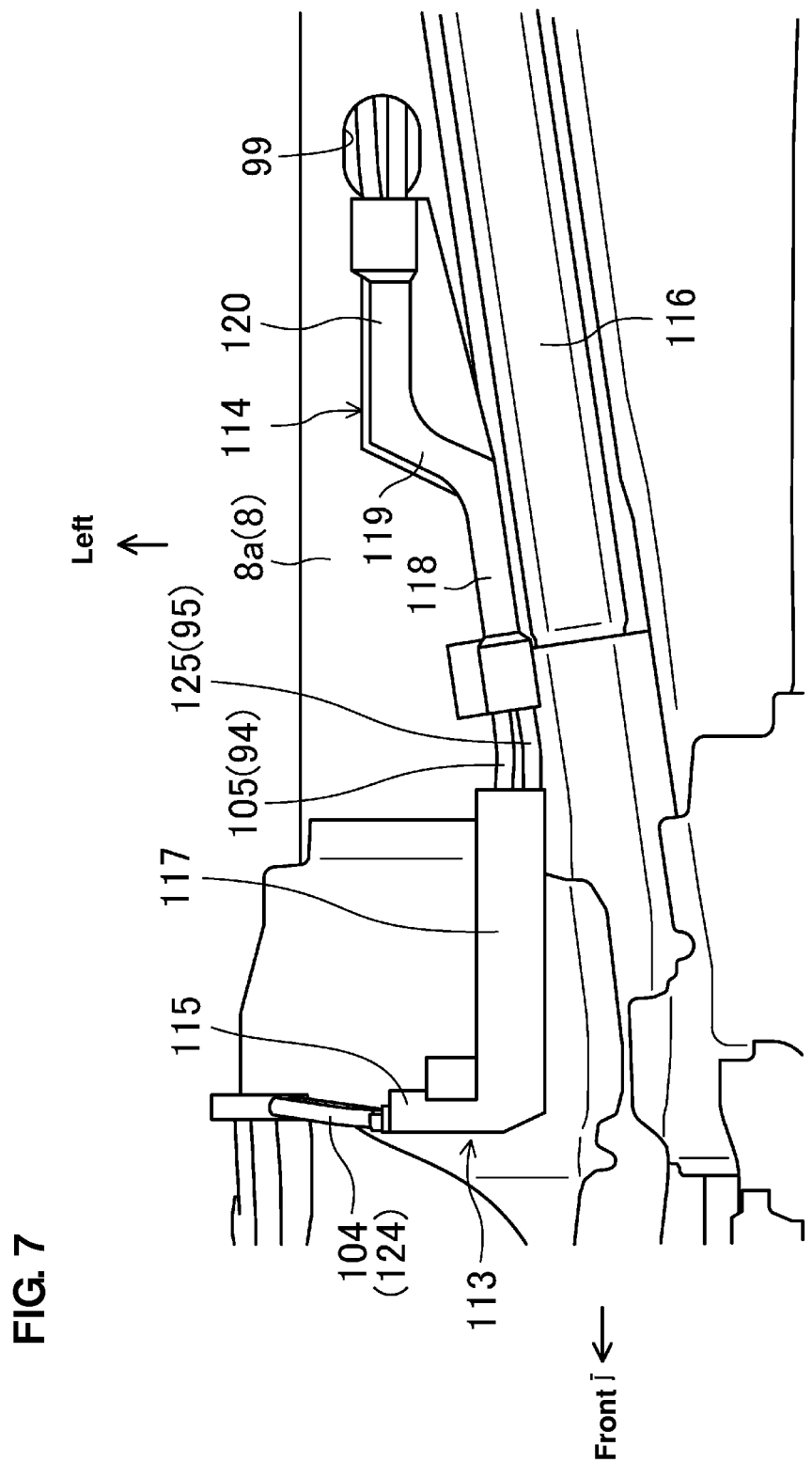
FIG. 7 is a bottom view showing a lower face of a front-side portion of a front floor portion of a floor panel.

The second harness 94 includes, along the mudguard 93 (wheel arch) above the left-side front wheel 3 as shown in FIGS. 5 and 6, an arc-shaped portion 102 which curves and protrudes upward, a lowering portion 103 which extends rearward and downward along a front face of a left side portion of the dash panel 9 as shown in FIG. 6, a side extension portion 104 which extends in the vehicle width direction along a lower end portion of the dash panel 9 and a lower face of a front end portion of the floor panel 8, as shown in FIG. 7, a rear extension portion 105 which extends rearward from an inside end of the side extension portion 104 along the lower face of the floor panel 8 as shown in FIG. 7, an introduction portion 106 which is introduced into the vehicle compartment (onto the floor panel 8) through the through hole 99 and connected to the convertor 92, and an electricity-storage-device side extension portion 107 which extends downward (toward the electricity-storage device 70) from a front end of the arc-shaped portion 102 and a lower end portion of which is connected to the connection portion 78 of the electricity-storage device 70 as shown in FIG. 5.

The arc-shaped portion 102 of the second harness 94 is provided between the mudguard 93 (its illustration is omitted in FIGS. 5 and 6) and the apron reinforcement member 16 arranged above the mudguard 93 in a state in which it is covered with a covering tube 108 together with an arc-shaped portion 122, which will be described later, of the third harness 95, and engaged with the apron reinforcement member 16 via plural engaging pieces 109. Thereby, the arc-shaped portion 102 of the second harness 94 is supported stably at the position between the mudguard 93 and the apron reinforcement member 16, so that any interference of the second harness with the front wheel 3 can be surely prevented.

Further, a second protector member 110 to protect the lowering portion 103 of the second harness 94 is attached to the front face of the side portion of the dash panel 9 as shown in FIG. 6. The second protector member 110 has an engagement hole 112 to receive an engaging pin 111 which is formed at the front face of the dash panel 9 and project for engagement of therebetween. Herein, after the second harness 94 (the lowering portion 103) is arranged along the front face of the side portion of the dash panel 9, the second protector member 110 is set to cover the lowering portion 103 of the second harness 94 from the vehicle front side so that the engaging pin 111 can be inserted into the engagement hole 112. Thereby, the second harness 94 can be fixed to the front face of the side portion of the dash panel 9 stably.

As shown in FIG. 7, to the lower face of the floor panel 8 (front floor portion 8*a*) are attached a third protector member 113 to protect the side extension portion 104 and the rear extension portion 105 of the second harness 94 and a fourth protector member 114 to protect a rear portion of the rear extension portion 105. The third and fourth protector members 113, 114 have engagement holes to receive engaging pins which are formed at the lower face of the floor panel 8 and project for engagement of therebetween, respectively, similarly to the second protect member 111.

The third protector member 113 comprises a lateral extension portion 115 which extends in the vehicle with direction along the front side portion of the floor panel 8 and a longitudinal portion 117 which extends longitudinally along an outside (left side) face of a floor frame 116 which is formed at the lower face of the floor panel 8 and connected to the left-side front side frame 5. The side extension portion 104 of the second harness 94 is fixed to the lower face of the front end portion of the floor panel 8 by the lateral extension portion 115 of the third protector member 113, and a front portion of the rear extension portion 105 of the second harness 94 is fixed to the lower face of the left side portion of the floor panel 8 by the longitudinal portion 117 of the third protector member 113.

Herein, it may preferable that the rear extension portion 105 of the second harness 94 be located in the vicinity of the floor frame 116, that is—at a position which is far from a left-side end edge of the floor panel 8 as further as possible. Thereby, even when a side collision occurs at a left-side face of the vehicle 1, the second harness 94 can be effectively protected from the collision load. Therefore, the side extension portion 104 is provided such that the rear extension portion 105 passes near the floor frame 116.

The fourth protector member 114 includes a front portion 118 which extends longitudinally along the outside (left side) face portion of the floor frame 116, a slant portion 119 which extends rearward and outward from a rear end portion of the front portion 118, and a rear portion 120 which extends rearward straightly from a rear end portion of the slant portion 119. The front portion 118 is provided behind and away from a rear end of the third protector member 113. A rear portion of the rear extension portion 105 of the second harness 94 is fit to the lower face of the floor panel 8 by this fourth protector member 114, and a middle portion of the rear portion of the rear extension portion 105 bends rearward and in the vehicle width direction by the slant portion 119.

Herein, it is preferable from view points of side-collision countermeasures described above that the slant portion 119 of the fourth protector member 114 be omitted such that the fourth protector member 114 extends straightly along the outside face of the floor frame 116. In this case, however, it may be necessary that the rear extension portion 105 of the second harness 94 extending straightly along the outside face of the floor frame 116 be bent upward and inserted into the through hole 99 at the floor panel 8 (the through hole 99 is also provided near the outside face of the floor frame 116) and then bent outward so as to extend toward the harness connection portion 253 of the convertor 92 and further bent rearward. Herein, since the second harness 94 and the like have a specified contour and a relatively high rigidity, it may be difficult for each of those to be bent in a certain direction in a short distance. Accordingly, it is preferable that the slant portion 119 be provided at the fourth protector member 114 such that the rear extension portion 105 is bent as described above at a specified position located forward with a certain distance from the through hole 99. Thereby, a situation in which the rear extension portion 105 of the second harness 94 is bent in the certain direction in the short distance can be avoided properly.

Figure 8:
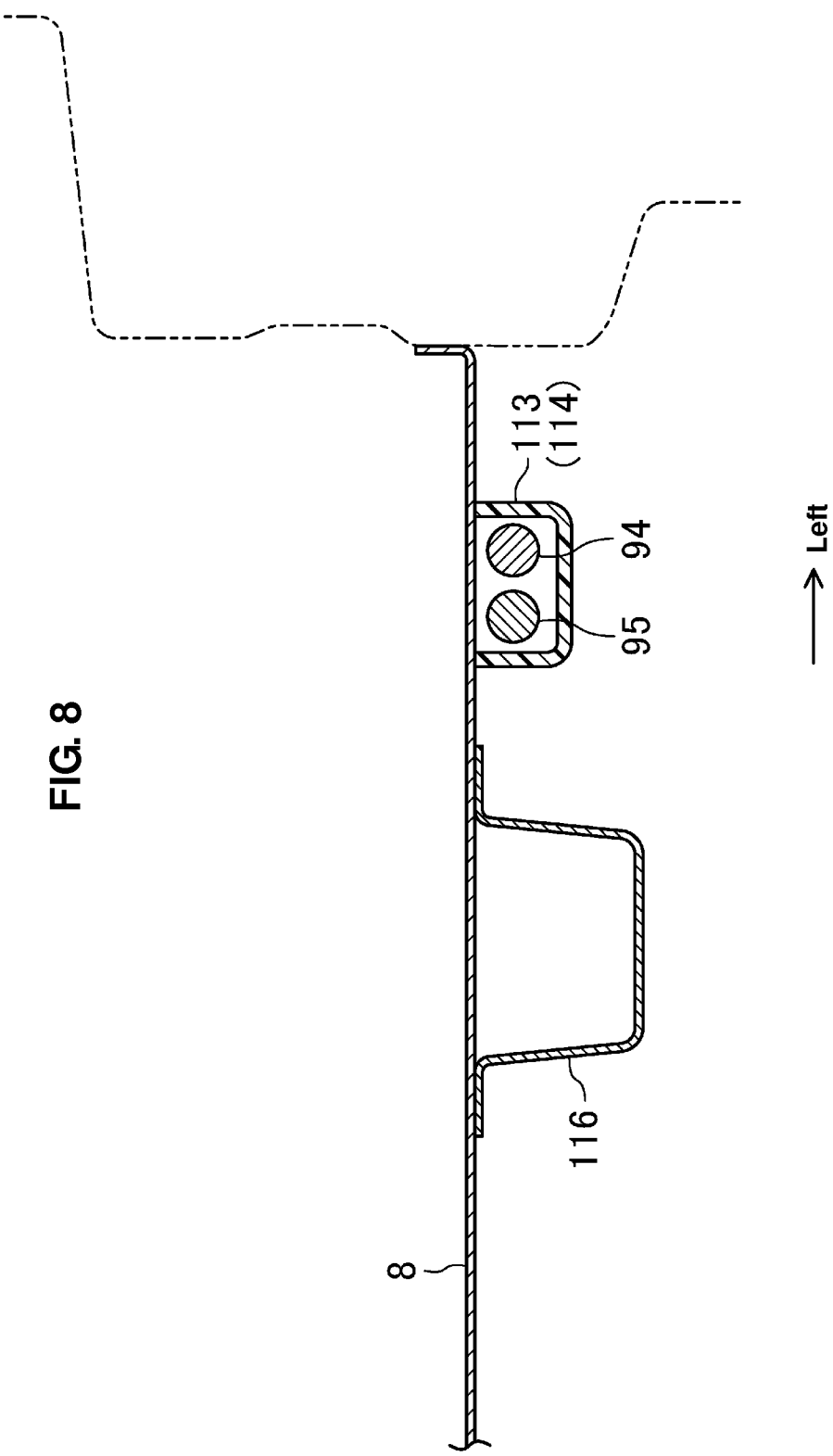
FIG. 8 is an elevational sectional view showing an arrangement portion of the second and third harnesses at a lower face of the front floor portion.

As shown in FIG. 8, the vertical length of the third and fourth protector members 113, 114 is set to be smaller than that of the floor frame 116 (i.e., a frame member) which is provided along the lower face of the floor panel 8. Accordingly, the lower end face of the third and fourth protector members 113, 114 is located above the level of the lower end face of the floor frame 116, the third and fourth protector members 113, 114 can be restrained from interfering with the road surface, thereby avoiding any damage of those.

Further, as shown in FIGS. 1 and 2, the battery 121 is arranged so as to face to the inside portion of the left-side front side frame 5 in the engine room 2. This battery 121 is located above the transmission 201 and fixed to the left-side front side frame 5. By arranging the battery 121 above the transmission 201 which has the smaller height than the engine 200 as described above, the battery 121 can be disposed in the engine room 2 with space efficiency. Thus, the battery 121 is provided on the left side of the vehicle 1, similarly to the electricity-storage device 70 and the convertor 92.

The third harness 95 connecting the convertor 92 and the battery 121 is basically provided in parallel to the second harness 94. That is, the third harness 95 comprises an arc-shaped portion 122 which curves upward in the side view along the above-described wheel arch, a lowering portion 123 which extends rearward and downward along the front face of the side portion of the dash panel 9, a side extension portion 124 which extends in the vehicle width direction along the lower end portion of the dash panel 9 and the lower face of the front end portion of the floor panel 8, a rear extension portion 125 which extends rearward from a inside end of the side extension portion 124 along the lower face of the floor panel 8, an introduction portion 126 which is introduced into the vehicle compartment (onto the floor panel 8) through the through hole 99 and connected to the convertor 92, and a battery-side extension portion 127 which extends inward (toward the battery 121) from a front end of the arc-shaped portion 122 and an inside end portion of which is connected to a terminal of the battery 121. The third harness 95 and the second harness 94 are bound together via the arch-shaped portion 122, lowering portion 123, side extension portion 124, and rear extension portion 125 of the third harness 95 and their corresponding portions of the second harness 94.

The arc-shaped portion 122 of the third harness 95 is, as described above, provided between the mudguard 93 and the apron reinforcement member 16 provided above the mudguard 93 in a state in which it is covered with the covering tube 108 together with the arc-shaped portion 102 of the second harness 94, and engaged with the apron reinforcement member 16 via the plural engaging pieces 109. Further, the lowering portion 123 of the third harness 95 is fixed to the front face of the left side portion of the dash panel 9 by the second protector member 110, integrally with the lowering portion 103 of the second harness 94. Further, the side extension portion 124 and the rear extension portion 125 of the third harness 95 are fixed to the lower face of the floor panel 8 by the third and fourth protector members 113, 114, integrally with the side extension portion 104 and the rear extension portion 105 of the second harness 94. Further, the introduction portion 126 of the third harness 95 extends toward the harness connection portion 253 in parallel to the introduction portion 106 of the second harness 94 above the floor panel 8 (in the vehicle compartment).

The battery-side extension portion 127 of the third harness 95, as shown in FIGS. 2 and 5, branches from the second harness 94 at a front end of the arc-shaped portion 122, and extends inward, upward and rearward, toward the battery 121. An end portion of this battery-side extension portion 127 is connected to the battery 121.

Thus, by the third harness coupling the convertor 92 and the battery 121, the electricity with the lowered voltage through the convertor 92 is supplied to and stored at the battery 121. Herein, the battery 121 and the vehicle electric load 245 are connected by the harness, not illustrated, such that the electricity is supplied from the battery 121 to the vehicle electric load 245 via this harness, and the electricity is supplied from the electricity-storage device 70 to the vehicle electric load 245 via the second harness 94, the convertor 92, the third harness 95 and the above-described harness, not illustrated.

As described above, according to the present embodiment, since the engine 200 is provided between the pair of front side frames 5 at the offset position on the one side (right side), in the vehicle width direction, of the vehicle, the generator 85 is provided at the front portion of the engine 200, and the electricity-storage device 70, the convertor 92, and the battery 121 are provided on the other side (left side), in the vehicle width side, of the vehicle 1 which is opposite to the one side where the engine 200 is provided, the battery 121 provided in the engine room 2 and the electricity-storage device 70 provided near the other side (left side) of the engine room 200 can be restrained from receiving any heat influence from the engine 200. In particular, since the electricity-storage device 70 which generates the heat is provided outside the engine room 2 and in front of the front wheel 3, it can be efficiently cooled by the vehicle traveling air, effectively preventing any improper heat influence from the engine 200.

Further, since the electricity-storage device 70, the convertor 92, and the battery 121 are provided on the same side (left side) in the vehicle width direction, the second and third harnesses 94, 95 coupling the electricity-storage device 70, the convertor 92 and the battery 121 can be properly arranged in the space at the left-side portion of the vehicle 1, so that the length of the second and third harnesses 94, 95 can be shortened. While the generator 85 is arranged at the front portion of the engine 200 and the right-side portion of the vehicle 1, the length of the first harness 86 can be shortened as well by arranging the first harness 86 coupling the generator 85 and the electricity-storage device 70 such that it extends substantially straightly in the vehicle width direction in the space between the engine 200 and the shroud 20. Moreover, since the generator 85 and the electricity-storage device 70 are located substantially at the same position in the vehicle longitudinal direction, it may not necessary to bend the first harness 86 longitudinally greatly. Accordingly, the total length of the first, second and third harnesses 86, 94, 95 can be shortened as shorter as possible.

Further, since the second harness 94 coupling the electricity-storage device 70 and the convertor 92 is arranged along the wheel arch formed by the mudguard 93, the length of the second harness 94 can be shortened as shorter as possible without any interference of the second harness 94 with the left-side front wheel 3 even if the electricity-storage device 70 and the convertor 92 are provided longitudinally relative to the left-side front wheel 3. Moreover, since the second harness 94 is disposed between the mudguard 93 and the apron reinforcement member 16 arranged above the mudguard 93 and engages with the apron reinforcement member 16, the stable disposition of the second harness 94 can be achieved and also the proper protection of the second harness 94 from rains, stones and the like during the traveling of the vehicle 1. These effects can be also obtained for the third harness 95 arranged along the wheel arch.

Also, since the battery 121 is provided near the left-side front wheel 3 in the engine room 2, the third harness 95 coupling the convertor 92 and the battery 121 and the second harness 94 can be bound together basically, thereby facilitate the arrangement of the second and third harnesses 94, 95.

Moreover, since the second and third harnesses 94, 95 are arranged along the front face of the left side portion of the dash panel 9 and the second protector member 110 to protect these harnesses is provided along the front face of the left side portion, it can be effectively prevented that the second and third harnesses 94, 95 improperly twist, so that the arrangement state of the second and third harnesses 94, 95 can be further stabilized.

Further, the convertor 92 is arranged above the floor panel 8, so that that can be protected from rains, stones and the like. Also, since the convertor 92 is provided below the front seat 221 and the second and third harnesses 94, 95 are arranged along the lower face of the floor panel 8 up to the vicinity of the arrangement portion of the convertor 92 (the position of the through hole 99), the convertor 92 and the second and third harnesses 94, 95 can be properly arranged, without narrowing the foot space of the passenger seated in the front seat 221.

In a case in which the convertor 92 is located below the driver's seat in particular, while it is possible that the second and third harnesses 94, 95 are introduced into the vehicle compartment through the through holes formed at the dash panel 9, it may be necessary to arrange the second and third harnesses 94, 95, avoiding each of pedal members. Herein, if the second and third harnesses 94, 95 are arranged along the lower face of the floor panel 8 as described above, these harnesses can be easily and properly arranged, without considering any interference with such pedal members and the like.

The present invention should not be limited to the above-described embodiment, and any other modifications or improvements may be applied within the scope of a spirit of the present invention.

For example, while the engine 200 is provided at the offset position located on the right side between the front side frames 5 and the electricity-storage device 70, the convertor 92 and the battery 121 are provided at the left-side portion of the vehicle 1 in the above-described embodiment, the engine 200 may be provided at an offset position located on the left side between the front side frames 5, and in this case the electricity-storage device 70, the convertor 92 and the battery 121 may be provided at a right-side portion of the vehicle 1.

Further, while the convertor 92 is arranged between the left-side front seat 221 and the floor panel 8 (the front floor portion 8a) in the above-described embodiment, it may be provided at a specified position in the engine room 2 which is located in back of the battery 121 (between the battery 121 and the dash panel 9), for example, providing the electricity-storage device 70 and the battery 121 similarly to the above-described embodiment. In this case, the length of the second and third harnesses 94, 95 can be shorter, compared to the case in which the convertor 92 is located in the vehicle compartment.

Moreover, while the electricity-storage device 70 is comprised of the capacitor in the above-described embodiment, it may be comprised of any other thing than the capacitor (for example, any rechargeable battery, such as a nickel metal hydride rechargeable battery, a nickel-cadmium rechargeable battery, a lithium-ion rechargeable battery, or a lead-acid battery, or the like). Herein, the capacity may be preferable in quickly conducting input/output of the electricity to the electricity-storage device 70.

What is claimed is:

1. An electric component arrangement structure of a vehicle, comprising:
   a right-and-left pair of front side frames extending in a vehicle longitudinal direction;
   a dash panel extending in a vehicle width direction from one of the side frames to another one of the side frames, the dash panel partitions a vehicle compartment from an engine room;
   an engine provided in the engine room, between the pair of front side frames at an offset position on one side, in the vehicle width direction, of the vehicle;
   a connection cross member extending in the width direction of the vehicle and having an attaching bracket, the connection cross member is disposed at a front side of the engine room;
   a generator driven by the engine to generate electricity;
   an electricity-storage device to store the electricity generated by the generator;
   a convertor to convert the electricity from the electricity-storage device;
   a battery, to which the electricity converted by the convertor is supplied; and
   harnesses coupling the generator, the electricity-storage device, the convertor and the battery,
   wherein said generator is provided at a front portion of said engine and on one side of the vehicle in the width direction, and said electricity-storage device, said convertor and said battery are provided on an opposite side of the vehicle in the width direction,
   wherein the harnesses include a first harness to couple the generator and the electricity-storage device, the first harness is fixed to the attaching bracket on the connection cross member, and
   wherein the generator and the electricity-storage device are located substantially at the same position in the vehicle longitudinal direction such the first harness coupling the generator and the electricity-storage device extends in the vehicle width direction from the generator toward the electricity-storage device, without bending in the vehicle longitudinal direction so that the length of the harness coupling the generator and the electricity-storage device is minimized.

2. The electric component arrangement structure of a vehicle of claim 1, wherein said electricity-storage device is provided on an outside, in the vehicle width direction, of one of said front side frames.

3. The electric component arrangement structure of a vehicle of claim 1, wherein said electricity-storage device is provided in front of one of front wheels, said convertor is provided in back of said one of the front wheels which is positioned on said other side, in the vehicle width side, of the vehicle, and wherein the harnesses include a second harness coupling said electricity-storage device and said convertor, the second harness is arranged along a wheel arch which is formed above said one of the front wheels.

4. The electric component arrangement structure of a vehicle of claim 2, wherein said electricity-storage device is provided in front of one of front wheels, said convertor is provided in back of said one of the front wheels, and wherein the harnesses include a second harness coupling said electricity-storage device and said convertor, the second harness is arranged along a wheel arch which is formed above said one of the front wheels.

5. The electric component arrangement structure of a vehicle of claim 1, wherein said convertor is provided between one of front seats and a floor panel.

6. The electric component arrangement structure of a vehicle of claim 2, wherein said convertor is provided between one of front seats and a floor panel.

7. The electric component arrangement structure of a vehicle of claim 3, wherein said convertor is provided between one of front seats and a floor panel.

8. The electric component arrangement structure of a vehicle of claim 1, wherein crash cans are provided at respective front ends of said pair of front side frames, and said electricity-storage device is provided in back of one of said crash cans.

9. The electric component arrangement structure of a vehicle of claim 2, wherein crash cans are provided at respective front ends of said pair of front side frames, and said electricity-storage device is provided in back of one of said crash cans.

10. The electric component arrangement structure of a vehicle of claim 3, wherein crash cans are provided at respective front ends of said pair of front side frames, and said electricity-storage device is provided in back of one of said crash cans.

11. The electric component arrangement structure of a vehicle of claim 1, further comprising a suspension cross member supporting both front wheels at both end portions thereof, wherein said suspension cross member includes a forward extension portion which extends forward below and substantially along one of said front side frames, and said electricity-storage device is located at the same position as a portion of said forward extension portion in the vehicle longitudinal direction, a lower end of which is located above a level of a lower end of the forward extension portion.

12. The electric component arrangement structure of a vehicle of claim 2, further comprising a suspension cross member supporting both front wheels at both end portions thereof, wherein said suspension cross member includes a forward extension portion which extends forward below and substantially along one of said front side frames, and said electricity-storage device is located at the same position as a portion of said forward extension portion in the vehicle longitudinal direction, a lower end of which is located above a level of a lower end of the forward extension portion.

13. The electric component arrangement structure of a vehicle of claim 3, further comprising a suspension cross member supporting both front wheels at both end portions thereof, wherein said suspension cross member includes a forward extension portion which extends forward below and substantially along one of said front side frames, and said electricity-storage device is located at the same position as a portion of said forward extension portion in the vehicle longitudinal direction, a lower end of which is located above a level of a lower end of the forward extension portion.

14. The electric component arrangement structure of a vehicle of claim 1, wherein said engine is provided laterally with an output shaft extending in the vehicle width direction, an air-intake duct is provided at a front portion of the engine, and said generator is provided beside said air-intake duct at the front portion of the engine.

15. The electric component arrangement structure of a vehicle of claim 1, wherein a transmission is provided on the opposite side of the vehicle where the generator is disposed relative to said engine, and said battery is provided above said transmission.

* * * * *